United States Patent [19]

Matsuo et al.

[11] 3,920,902

[45] Nov. 18, 1975

[54] OFF-PREMISES STATION LINE CIRCUIT FOR A KEY TELEPHONE SYSTEM

[75] Inventors: Kazuaki Matsuo, Kawasaki, Japan; Stephen E. Kerman, Merrick, N.Y.

[73] Assignees: Nippon Tsu Shin Kogyo K.K., Japan; TIE/Communications Inc., Stamford, Conn.

[22] Filed: Apr. 5, 1973

[21] Appl. No.: 348,279

[52] U.S. Cl. ............. 179/99; 179/18 B; 179/18 AB

[51] Int. Cl.$^2$ ............ H04M 9/00

[58] Field of Search .......... 179/99, 37, 38, 39, 18 B, 179/18 BB, 18 AD, 18 BA, 1 H, 84 R, 84 A, 18 AB, 17 B, 30

[56] References Cited

UNITED STATES PATENTS

| | | | |
|---|---|---|---|
| 2,458,262 | 1/1949 | Grimes | 179/18 AB |
| 2,644,041 | 6/1953 | Mercer | 179/18 AB |
| 2,814,675 | 11/1957 | Mallalieu | 179/38 |
| 3,521,004 | 7/1970 | Bierman | 179/18 AB |
| 3,535,461 | 10/1970 | Hugyecz | 179/18 AB |
| 3,604,857 | 9/1971 | Opferman | 179/99 |
| 3,665,112 | 5/1972 | Blake et al. | 179/18 B |
| 3,701,855 | 10/1972 | Reynolds | 179/18 B |

*Primary Examiner*—Kathleen H. Claffy
*Assistant Examiner*—Gerald L. Brigance
*Attorney, Agent, or Firm*—Kenyon & Kenyon, Reilly, Carr & Chapin

[57] ABSTRACT

Electrical apparatus for use in a key telephone system to enable connection of a non-key telephone set at a nearby or remote off-premises location to one or more of the key telephone sets in the system via the key system intercommunication circuits.

4 Claims, 2 Drawing Figures

OFF-PREMISES STATION LINE CIRCUIT FOR A KEY TELEPHONE SYSTEM

BACKGROUND OF THE INVENTION

The invention relates to key telephone systems which are equipped to provide dial selected intercommunication among the key telephone sets in the system.

In key telephone systems intercom circuits with plural speech paths selected by operation of plural keys at the station sets, installation of a station at a remote point distant from the remainder of the system has presented difficulty in the past due to the need to extend numerous conductors to the remote point. Even if only intercommunication is required to and from preselected remote stations in the conventional system, the major portion of the key telephone set apparatus at that preselected station, and the extensive cabling connections thereto, are necessary but remain unused, while the cost of each conductor extended to the remote station is very high.

SUMMARY OF THE INVENTION

It is therefore, an object of the present invention to provide electrical apparatus to enable connection of a non-key telephone set into a key telephone system, over a minimum number of conductors, thereby decreasing the cost and complexity of the remote intercom station.

In accordance with the present invention, key service unit apparatus for enabling intercommunication between a telephone set and at least one key telephone set in a key telephone system, by use of an intercom line circuit in said key service unit, comprises, in combination, input and output terminal means, and means, including at least one normally released relay for testing the status of and connecting to at least one intercom line circuit, when a circuit is idle, and for preventing connection in response to a line busy status indication from the tested intercom line circuit, and for returning an audible busy tone when all such line circuits are busy.

DETAILED DESCRIPTION OF THE INVENTION

The present invention relates to electrical apparatus for intercommunication to and from one or more key telephone sets in a key telephone system and a non-key telephone set located at a nearby or remote location on or off the premises served by the key telephone system, and electrically connected thereto. The key telephone system, which incorporates the present invention, comprises a key service unit and a plurality of key telephone sets connected thereto by multipair cables.

Figure 1:
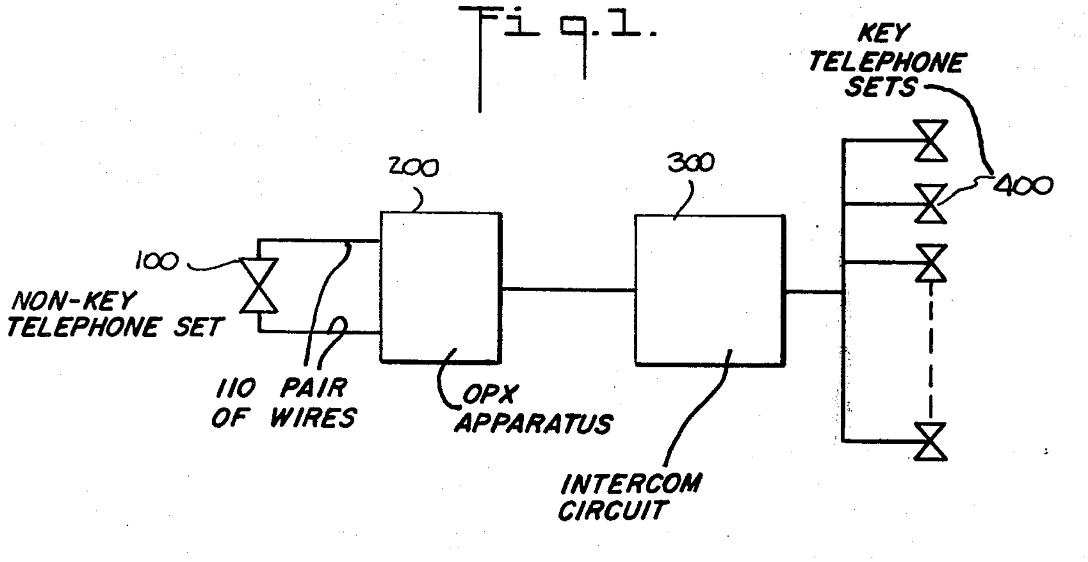
FIG. 1 is a block diagram illustrating a key telephone system incorporating an off-premises extension circuit, and associated apparatus, constructed in accordance with the present invention.

In accordance with the present invention (FIG. 1), an ordinary (non-key) telephone 100 is placed at each location between which only intercommunication is required with the key telephone sets 400, and is connected to the key service unit intercom circuit 300, which comprises (FIG. 2) one or more (shown as two in this example) intercom line circuits INU-1 and INU-

2, a tone supply circuit 17 and a register circuit 18, by a single pair of wires 110 and off-premises extension (OPX) electrical apparatus 200 constructed in accordance with the present invention. Register 18 and tone supply 17 service all the intercom lines and stations in the key telephone system, and are arranged to permit voice paging through a loudspeaker used as the call signal device in each key telephone set with two digit dialing, and to send a periodic tone signal if three digits are dialled. It is to be understood that off-premises extension (OPX) apparatus 200 may be physically incorporated into the key service unit 300, or located adjacent thereto.

Figure 2:
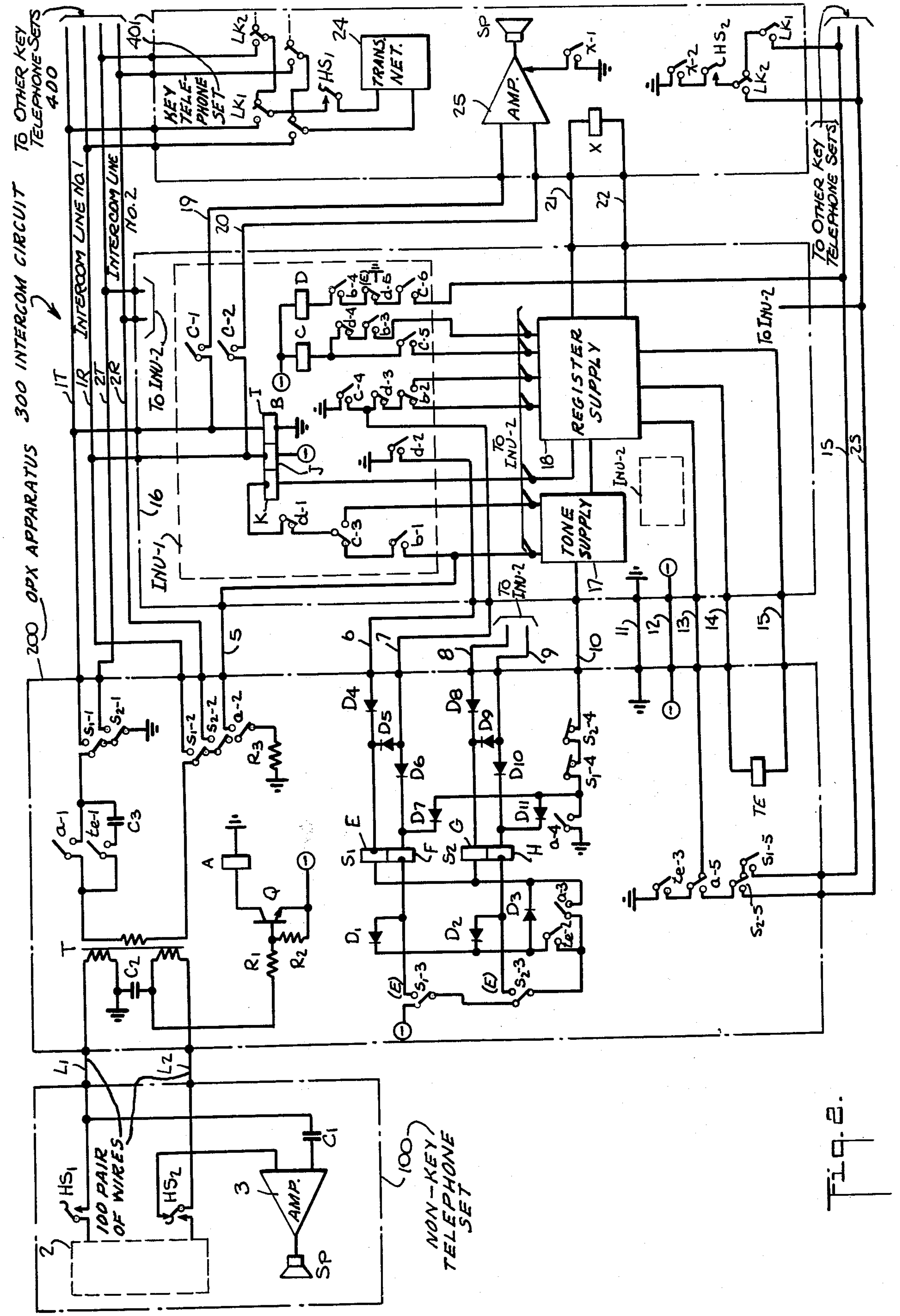
FIG. 2 is an electrical schematic and block diagram of one embodiment of the present invention.

Referring to FIG. 2, non-key telephone set 100 includes a transmission network 2 connected through hookswitch make contacts HS1, HS2, and line conductors 110 comprising leads L1 and L2 to the OPX apparatus 200. The telephone set 100 includes an amplifier 3 whose output drives speaker SP. A d-c blocking capacitor C1 is connected between line L1 and one input terminal of amplifier 3. The other input terminal of amplifier 3 is coupled to line L2 via hookswitch break contact HS2.

INTERCOM CALLING FROM OFF-PREMISES EXTENSION 100

When intercommunication between telephone set 100 and one of the plurality 400 of key telephone sets 401 is initiated, the handset (non illustrated) of set 100 is lifted, and hookswitch make contacts HS1, HS2 thereby close. Current flows from ground, through a winding of voice frequency transformer T, the L1 conductor, hookswitch contact HS1, transmission network 2, hookswitch contact HS2, lead L2, another winding on transformer T, resistors R1 and R2 and transistor Q to negative battery at the OPX circuit, thereby initiating collector current flow, and energizing relay A. The consequent closure of make contacts a3, a4 completes a circuit path from ground potential through diodes D7 and D11 respectively, through windings F and H of idle intercom line selecting relays S1, S2, respectively, and through diodes D1 and D2 respectively and D3 and contacts *a*3, *s*2-3 and *s*1-3 to battery. Relay S1 performs testing and selecting functions for intercom line circuit INU-1, and relay S2 performs the same functions for intercom line circuit INU-2.

Although current initially flows through both the S1 and S2 relay coils, the opening of the *s*1-3 break contact removes negative battery from winding H of relay S2, which then cannot remain operated. Relay S1 is held operated by closure of its make contact *s*1-3.

When relay S1 operates, intercom relay B is energized by current from ground at winding 1, thereof, via make contacts *s*1-1, *s*1-2, *a*-1, the primary winding of transformer T, winding J of relay B to the negative battery source, operating relay B. Closure of relay contact *b*3 couples ground potential from register circuit 18 via relay contact *d*4 to the winding of call origination relay L, which then operates.

The operation of relays A, S1 and C couples ground potential to the register circuit 18 via relay contacts *c*-4, *d*-3 and *b*-2. Register circuit 18 is thereby enabled for receiving dial pulses from telephone set 100. Moreover, a dial tone circuit is completed in the loop comprising register circuit 18, tone supply 17, contacts *c*-3, *d*-1, and winding K of relay B. By this circuit, dial tone signal is induced from winding K into windings I and J of relay B, and coupled over conductors 1T, 1R through relay contacts *s*1-1, *s*1-2, *a*-1 to transformer T and then to transmission network 2, producing an audible dial tone in the handset thereof.

The trains of dial pulses generated by the interruption of the dial contacts (not shown) in the transmission network 2 switch transistor Q off and on, thereby pulsing relay A, which in effect follows the dialing at telephone set 100. As a result, relay contact *a*-1 breaks and makes at the dial pulse rate, thereby pulsing relay B by its contact *a*-1 at the same rate over the 1T and 1R leads. Register circuit 18 counts the dial pulses by counting the closures of relay break contact *b*-2. Ground from contact *c*-4 through conductor 7 and diode D6 keeps S1 operated while contact *a*-4 is open during pulsing.

At the completion of dialing, register circuit 18 connects negative battery and positive ground via conductors 21, 22 to key telephone set 401 incoming call indication relay X, which then operates. Make contact *x*-1 couples ground to speaker amplifier 25, which drives speaker SP, turning it on. During this time, relay C is held operated by the connection of ground potential, via make contact *c*-5, from the register circuit 18. Voice signals from telephone set 100 is coupled through transformer T to conductors 1T, 1R, and via make contacts *c*-1, *c*-2 to amplifier 25 and speaker SP, permitting the called party to be alerted by voice paging through his set.

Moreover, register circuit 18 is constructed and arranged to activate tone supply circuit 17 if three digits are dialed, generating a calling tone which is connected via relay contacts *c*-3 make and *d*-1, to winding K of relay B. This calling tone is induced into windings I, J of relay B, and via relay contacts *c*-1, *c*-2 and conductors 19, 20 is coupled to the amplifier 25 and speaker SP. At the same time, the same calling tone is transmitted via leads 1T, 1R, relay contacts *s*1-1, *s*1-2, *a*-1, transformer T and line conductors L1, L2 back to the transmission network 2, and is heard in the handset there as a ring-back tone.

When the called party answers by lifting the handset (not shown) of key telephone set 401, and operating the line key, whose contacts LK1 are shown, hookswitch contacts HS1 and HS2 close, grounding conductor 1S via relay contact *x*-2, line key LK2 break contact, line key LK1 make contact, and energizing call answering relay D via relay contacts *c*-6, *d*-5 break, and *b*-4 thereby operating it. Relay D is held operated by current from ground via early make contact *d*-5 and make contact *b*-4.

Ground is disconnected from counting circuit 18, which is thereby reset, by the opening of break contact *d*-3. The calling tone and ring-back tone circuit is opened by contact *d*-1. When the counting circuit 18 is reset, the holding ground connected thereby to the coil of relay C via relay contact *c*-5 is removed. In addition, the prior opening of break contact *d*-4 has disconnected the operating circuit to the coil of relay C, which then releases.

Release of relay C opens make contacts *c*-1, *c*-2, thereby disconnecting the 1T, 1R conductors from amplifier 25. At this time, a voice communication path has been established between telephone set 100 and key telephone set 401, via conductors L1 and L2, transformer T, relay contacts *a*-1, *s*1-1 and *s*1-2, lines 1T, 1R and through line key make contacts LK1 to the transmission network 24 of the key telephone set.

When the handset of telephone set 100 is replaced on its hookswitch, supervisory relay A is released; selecting relay S1 releases as s result of the opening of both make contacts *a*-4 and *c*-4. Release of relays A and S1 restores the OPX apparatus 200 to its idle condition. Moreover, when the handset of key telephone set 401 is replaced on its hookswitch, relay B releases, opening make contact *b*-4, thereby releasing relay D. Accordingly, the intercom line circuit INU-1 in the key service unit is also restored to its idle condition.

INTERCOM CALLING TO OFF-PREMISES EXTENSION 100

When the subscriber at a key telephone set wishes to call the subscriber at the off-premises extension, he lifts his handset and operates line key LK1, thereby closing a loop across windings I and J of intercom relay B. Relay B then operates, and as already described, operation of relay B results in the operation of relay C. As also described above in detail, a dial tone signal from tone supply circuit 17 is induced into windings I and J of relay B from winding K thereof, and is transmitted to the transmission network 24 of the key telephone set 401. When this dial tone is heard by the subscriber, the station code assigned to telephone set 100 is then dialed at the key telephone set.

As a result of dialing the off-premises extension code, OPX apparatus relay TE is energized by d-c current connected thereto from register circuit 18 over leads 14 and 15. Current then flows via make contact *c*-4 and lead 7 to the OPX apparatus 200, through winding F of relay S1 via diodes D6, D1, make contact *te*-2 and break contacts *s*2-3 and *s*1-3, and to negative battery. Relay S1 is thereby operated, and held operated by make-before-break contact *s*1-3.

At this time, if two digits were dialed, a one way voice communication path is established between key telephone set 401 and telephone set 100. This path includes transmission network 24, line key LK1 make contacts, conductors 1T, 1R, make contacts *s*1-1, *s*1-2, *te*-1, capacitor C3, transformer T, capacitors C2 and c1, amplifier 3 and speaker SP at the telephone set 100. Voice calling signals can be reproduced through the speaker SP over this path. Moreover, as described above, if three digits are dialed, a calling tone signal from tone supply circuit 17 can also be coupled to telephone set 100, by induction through the windings of relay B to conductors 1T, 1R, thence to the amplifier-speaker network 3, SP.

When the called subscriber at telephone set 100 lifts his handset from the hookswitch, the calling signal is disconnected from the amplifier-speaker network 3, SP by contact HS2. At this time, relay A is operated, as described above in detail. With relays A, S1 and TE operated, ground is connected via relay contacts te-3, *a*-5, *s*2-5 break and *s*1-5 make, conductor 1S, and contacts *c*-6, *d*-5 and *b*-4 to relay D, which is thereby operated. Relay D is held operated by the connection to ground through relay contact *b*-4 and make contact *d*-5.

It should be noted that relay S1 is now held operated by ground via relay contact *a*-4, diode D7, winding F of relay S1 and make contact *s*1-3 to negative battery. During this time, the same voice communication path between transmission network 2 of telephone set 100, and transmission network 24 of key telephone set 401 is established, as described above in detail with reference to intercom communications initiated by telephone set 100.

GENERAL CONSIDERATIONS

It has been noted that a plurality of intercommunication line circuits INU-1, INU-2 can be provided in the key service unit 300. This plurality of lines has common access to register circuit 18 and tone supply circuit 17. The off-premises line circuit 200 is arranged to select an idle intercom line circuit when a call is originated. If the first intercom network INU-1 is busy, for example, having been selected for an earlier call from key telephone set 401 to telephone set other than telephone set 100, the following circuit operation occurs when the handset at telephone set 100 is lifted from its hookswitch to originate a call.

As described above in detail, relay A is operated. At this moment, however, current flows in both windings E and F of relay S1 due to operation of relays C or D due to the busy condition of intercom line INU-1, and the closing of contacts *a*-3 and *a*-4. These windings generate opposing magnetic fields of equal magnitude, therefore, relay S1 does not operate. Current flows in winding E of relay S1 in a path from ground to negative battery via relay contact *c*-4 in intercom line circuit INU-1, diode D-5, winding E, relay make contact *a*-3, and break contacts *s*2-3 and *s*1-3. Current also flows in winding F of relay S1 in a path from ground to negative battery via the same relay contact *c*-4, diode D6, winding F, diodes D1, D3, relay make contact *a*-3, and break contacts *s*2-3 and *s*1-3. Current will also flow from ground through make contact *a*-4 and diode D7 and through winding F. Alternately, current may flow via contact *d*-2 and diode D4 to winding E, instead of from contact *c*-4 and diode D5.

Although relay S1 does not operate, if INU-2 is idle, relay S2 operates as a result of the current flow from ground to negative battery through winding H of relay S2 via relay contact *a*-4, diodes D11, D2, D3, relay make contact *a*-3, and break contacts *s*2-3 and *s*1-3. Because INU-2 is idle, no current flows through winding G. Relay S2 is therefore operated and then held by make contact *s*2-3.

The operation of relay S2 closes contacts *s*2-1, *s*2-2 and thereby connects transformer T to conductors 2T, 2R, and thereby to intercom circuit INU-2 and results in the operation of relay B in intercom circuit INU-2. The operation of this relay B is the same as already described above with reference to relay B in intercom circuit INU-1. However, the intercom line circuits are arranged so that if intercom circuit INU-1 has seized register circuit 18, the ground connection to relay C via contacts *b*-3 and *d*-4 in intercom circuit INU-2 is not established. Hence relay C in circuit INU-2 does not operate.

In this condition, a busy tone is sent from the tone supply circuit 17 to the winding K of relay B in intercom circuit INU-2 through contacts *b*-1 make, *c*-3 break and *d*-1 break. This busy tone signal is induced into windings I and J of relay B, thence to conductors 2T, 2R, and transformer T to transmission network 2 in telephone set 100. A busy tone is thus heard in the handset of that telephone.

If intercom circuit INU-1 is busy in the talking condition and the register is not busy with INU-1, when the handset of telephone set 100 is lifted from its hookswitch, relay S1 does not operate, but relay S2 does. When a relay S2 is operated, relay B of intercom circuit INU-2 operates as described above.

When relay B is operated, ground potential is connected from register circuit 18 to relay C in intercom circuit INU-2 via relay contacts *b*-3 and *d*-4. Relay C thereby operates, and dial tone is transmitted from the intercom circuit INU-2 over conductors 2T, 2R to the transmission network 2, in the same manner as described above with reference to intercom circuit INU-1. The operations of dialing and voice transmission between telephone set 100 and the called key telephone set are the same for intercom circuit INU-2, except that the above-described functions of OPX apparatus 200 relay make contacts *s*1-1, *s*1-2 and *s*1-5 are now performed by OPX apparatus 200 relay make contacts *s*2-1, *s*2-2 and *s*2-5, respectively.

In the event that the subscriber at telephone set 100 lifts his handset from the hookswitch when intercom circuits INU-1 and INU-2 are both already in use for dialing or voice communication, both OPX apparatus 200 relays S1 and S2 remain unoperated because of the opposing magnetic fluxes generated by the currents flowing in windings E and F, and G and H, respectively, via ground connections thereto from contacts *c*-4 or *d*-2 in intercom circuits INU-1 and INU-2. Accordingly, ground is connected through relay contacts *a*-4, *s*1-4 and *s*2-4 to the tone supply circuit 17, which is thereby activated to transmit a busy tone through the circuit path to ground comprising make contact *a*-2, break contacts *s*2-2, *s*1-2, transformer T, make contact *a*-1, and break contacts *s*1-1 and *s*2-1. This busy tone is coupled by the transformer T to the transmission network 2, which produces an audible tone in the handset.

Moreover, when intercom circuit INU-1 is in use and intercom circuit INU-2 is idle, the subscriber at a key telephone set can seize the idle circuit by operating his line key LK2 and lifting the handset from its hookswitch. At this time, relays B and C of intercom circuit INU-2 are operated in the same manner as described above with reference to intercom circuit INU-1. As a result of dialing the off-premises extension code, current is supplied from register circuit 18 to the winding of relay TE in the OPX apparatus over conductors 14 and 15. Relay TE operates and ground from relay contact *c*-4 of intercom circuit INU-2 is connected to winding H of relay S2, operating it in the manner described for relay S1 and winding F earlier. Depending upon whether two or three digits are dialed, a voice signal or a calling tone is transmitted from intercom circuit INU-2 to amplifier 3 of telephone set 100 via the 2T and 2R leads, and reproduced by speaker SP. When the handset of telephone set 100 is removed from its hookswitch, a voice communication path is established between telephone set 100 and key telephone set 401 via intercom circuit INU-2.

While specific embodiments of the invention have been disclosed, variations in procedural and structural detail within the scope of the appended claims are possible, and are contemplated. There is, therefore, no intention of limitation to the abstract, or the exact disclosure herein presented.

What is claimed is:

1. Key service unit apparatus for enabling intercommunication between a non-key telephone set and at least one key telephone set in a key telephone system, by use of at least one intercom line circuit connected to said key service unit, comprising, in combination, input and output terminal means;

means, including at least one normally released first relay for automatically testing and connecting to said intercom line circuit when said circuit is idle, and for preventing establishment of a connection in response to a line busy status indication from said tested intercom line circuit;

means, including a normally released second relay operated by an off-hook condition at said non-key telephone set, for establishing an intercom line testing path through said first relay, and for supplying signals, representative of dial pulses generated at said non-key telephone set to said selected idle intercom line; and means, including make contacts of said first and second relays, for electrically connecting said input and output terminal means.

2. Apparatus according to claim 1 wherein a plurality of said intercom line circuits are provided further comprising means, including a plurality of additional relay means, provided in one-to-one correspondence with said intercom line circuits, for testing said plurality of and connecting to one of said plurality of intercom line circuits, when one or more of said circuits are idle, and for preventing connection thereto in response to busy status indications from said plurality of intercom line circuits; and further wherein said means, including said normally released second relay means, is additionally for establishing an operating current path to said plurality of additional relay means, the enumerated means being so proportioned and the combination being so constructed and arranged that said non-key telephone set has access through said key service unit apparatus to any one of said plurality of intercom line circuits whenever any one or more of said intercom line circuits are idle.

3. Apparatus according to claim 2 additionally comprising further means, including a normally released relay responsive to an incoming call indication signal from one of said intercom line circuits, for establishing an operating path to said plurality of additional relay means, thereby operating the one of said additional relay means corresponding to the one of said plurality of intercom line circuits on which the call is being originated.

4. Apparatus according to claim 3 in which each of said plurality of additional relay means comprise two windings on a common core connected in mutual opposition so that each of said additional relay means can be operated in response to an idle indication from its corresponding intercom line circuit, and prevented from operating in response to a busy indication from said intercom line circuit.

* * * * *